United States Patent

Collins et al.

[11] Patent Number: 4,758,392
[45] Date of Patent: Jul. 19, 1988

[54] METHOD OF SPIN-WELDING

[75] Inventors: Malcolm G. Collins, Oxfordshire; Raymond Baldwin, Cheshire, both of England

[73] Assignee: Metal Box P.L.C., Reading, England

[21] Appl. No.: 18,469

[22] Filed: Feb. 25, 1987

[30] Foreign Application Priority Data

Mar. 26, 1986 [GB] United Kingdom ............... 8607531

[51] Int. Cl.$^4$ ..................... B29C 47/00; B29C 65/06
[52] U.S. Cl. ..................................... 264/68; 156/73.5; 264/150; 264/229; 264/248
[58] Field of Search ............. 264/68, 150, 229, 248; 156/73.5

[56] References Cited

U.S. PATENT DOCUMENTS

| | | | |
|---|---|---|---|
| 3,120,570 | 2/1964 | Kennedy et al. | 156/73.5 X |
| 3,538,595 | 11/1970 | Barnes | 264/150 X |
| 3,982,980 | 9/1976 | Van Manen | 156/73.5 |
| 4,353,761 | 10/1982 | Woerz et al. | 156/73.5 X |

Primary Examiner—Jan H. Silbaugh
Assistant Examiner—Yun H. Wang
Attorney, Agent, or Firm—Burns, Doane, Swecker & Mathis

[57] ABSTRACT

An end component 3 is spin-welded into the cut end of an extruded tube 1 with the application of axial pressure but without the application of radial pressure to the weld area. The radial forces required to create a weld are provided by hoop stresses which are formed in the tube by shock-cooling the tube as it emerges from the extrusion die. When the tube is cut, the hoop stresses cause the cut end of the tube to contract radially prior to insertion of the end component. To assist in insertion of the end component, a cylindrical skirt thereof 4 is provided with a chamfered end 9.

8 Claims, 4 Drawing Sheets

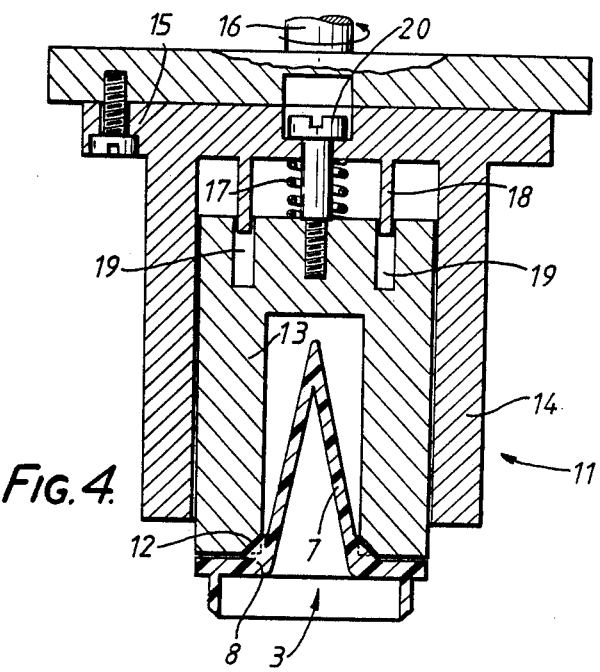
Fig. 4.
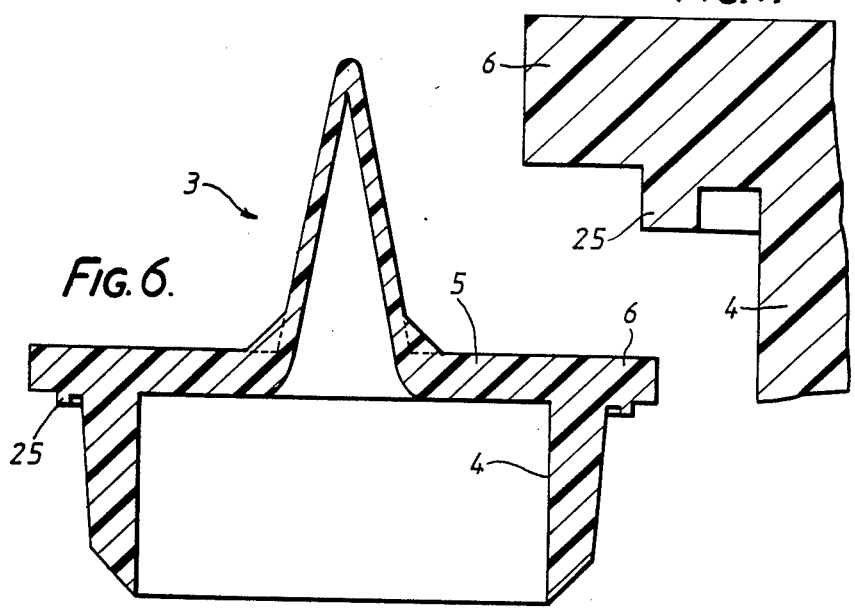
Fig. 6.
Fig. 7.

METHOD OF SPIN-WELDING

BACKGROUND TO THE INVENTION

1. Field of the Invention

The invention relates to a method of spin-welding a moulded plastics end component into an open end of an extruded plastics tube.

Spin-welding is a well known technique for welding together plastics components which are assembled with opposed annular surfaces, in which one of the components is spun at high speed relative to the other to cause welding and subsequent fusion of the plastics material at the interface of the opposed surfaces.

It has been found in the past that a certain radial pressure is necessary at the welding interface to generate the heat required for melting of the plastics material. This radial pressure has been provided in the past by an interference fit between the components and by external supporting means which restrain radial expansion of the components during assembly and subsequent spin welding. One of the drawbacks of spin-welding has been the fact that very fluid liquid plastics material—"flash"—can often escape from the weld area and may solidify as unsightly debris.

2. Prior Art

U.S. Pat. No 3,982,980 describes a method of making a cartridge for dispensing materials. A resin tube is extruded to have constant inside and outside diameters and the tube is cut off in equal lengths to provide the barrels of the cartridges and having ends evenly severed in planes perpendicular to the longitudinal axes of the barrels. Injection moulded end caps are fitted into the cut ends of the barrels with an interference fit and are then spin welded. During the assembly and spin welding process, the barrels are restrained against radial expansion by a surrounding tool which rotates with the end cap and is provided with cutting surfaces for the removal of flash debris.

There are several disadvantages associated with this prior method. First, the provision of an external restraint inevitably leads to marking of the external surface of the tube. Second, the plastics components and the surrounding tool must be manufactured within strict tolerances if reliable welds are to be produced. In this respect, the extrusion and cooling of the tubing must be controlled to keep the tubing accurately to the desired internal and external diameters. A third disadvantage arises from the configuration of the end cap which is of a countersunk design and has a tendency to dome outwardly when the container is pressurised, thus subjecting the weld to peel stresses which are likely to cause failure.

SUMMARY OF THE INVENTION

The object of the present invention is to provide an improved method of spin-welding a moulded plastics end component in the open end of an extruded plastics tube which does not suffer from the disadvantages of the prior art.

According to the invention, there is provided a method of spin-welding a moulded plastics end component into an open end of an extruded plastics cylindrical tube, wherein the end component comprises a substantially cylindrical flange dimensioned to fit within the open end of the cylindrical tube and an annular flange extending from the outer end of the cylindrical range and overlying the end face of the cylindrical tube when the end component and cylindrical tube are assembled, the method comprising the steps of (a) extruding the cylindrical tube from a die head and shock cooling the external surface of the cylindrical tube immediately after its emergence from the die head;

(b) cutting the cylindrical tube such that hoop stresses generated in step (a) cause the cut-end of the cylindrical tube to contract radially;

(c) inserting the end component into the contracted open end of the cylindrical tube such that the opposing cylindrical surfaces of the tube and the end component provide an area to be welded; and (d) spin-welding the end component to the cylindrical tube; wherein during step (d), an axial pressure is applied to the assembly sufficient to substantially prevent the escape of flash from the weld area but no radial pressure is applied to the assembly in the region of the weld area other than that provided by the interference fit between the end component and the tube and by the hoop stresses generated in the tube.

By the due recognition and use of the hoop stresses formed in a shock-cooled extruded plastic tube, the invention provides a method of spin-welding in which it is not necessary to apply radial pressure or a radial restraint to the weld area during welding, since the necessary radial forces are provided by the hoop stresses in the cut end of the tube. In this method, strict manufacturing tolerances are not required to provide an accurate interference fit between the components since the radially contracted cut end of the tube will resiliently accommodate variations in diameter of the end component. The escape of flash from the weld area is substantially prevented by the application of an axial pressure to the components during welding.

In the case where the end component and the cylindrical tube form a container, the construction of the end component is such that the weld will be subjected to shear stresses when the container is pressurised and thus the ability of the container to withstand internal pressure will be limited only by the strength of the end component.

In a preferred method, the end of the tube is cut in a manner which provides a chamfered profile such that during welding the axial pressure applied to the components is concentrated in the angle between the cylindrical and annular flanges of the end component.

The tube and end component are both preferably made from high-density polyethylene. In order to provide for preferential melting of the tube over the end component, the materials of the tube and end component may be chosen such that the latent heat of fusion of one is greater than the other.

To enhance ease of assembly of the components, the cylindrical flange of the end component may have a slight taper and may be provided at its inner end with a chamfered end or similar lead-in feature.

BRIEF DESCRIPTION OF THE DRAWINGS

FIG. 4 shows a sectional view through a spin-welding chuck with an end component engaged therewith;

FIG. 6 is a sectional view through a modified form of end component; and

FIG. 7 is an enlarged sectional view of a part of the end component shown in FIG. 6.

DETAILED DESCRIPTION OF THE PREFERRED EMBODIMENTS

Figure 1:
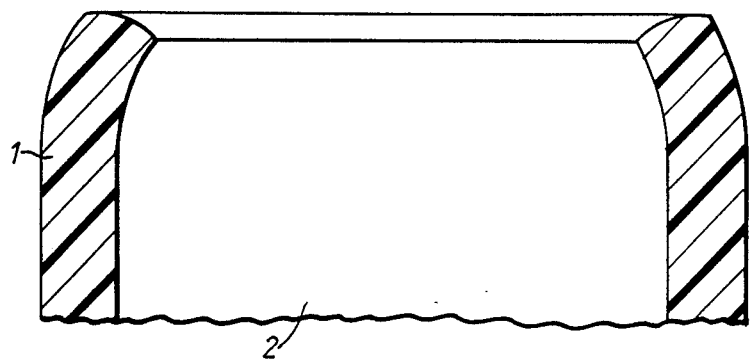
FIG. 1 shows a sectional view through a cut end of a tube.

The tube and end components shown in the drawings are intended for making a tubular dispensing container for mastic material. In this respect, the end component comprises a conical nozzle which may be cut to permit dispensing of material therethrough.

FIG. 1 shows the cut end 2 of a length of relatively thick-walled extruded high-density polyethylene tube 1. The external surface of the tube has been shock-cooled using chilled water immediately after emerging from the die head, thereby encouraging the creation of a less dense amorphous polymer structure towards the outside of the tube wall thickness, whilst inner portions of the wall thickness are enabled to cool more slowly and thereby naturally form a more dense crystalline structure.

Considerable hoop stresses are formed within the wall of such tubing and the partial relaxation of these stresses is manifested in a flaring in of the tube at its cut end.

Figure 2:
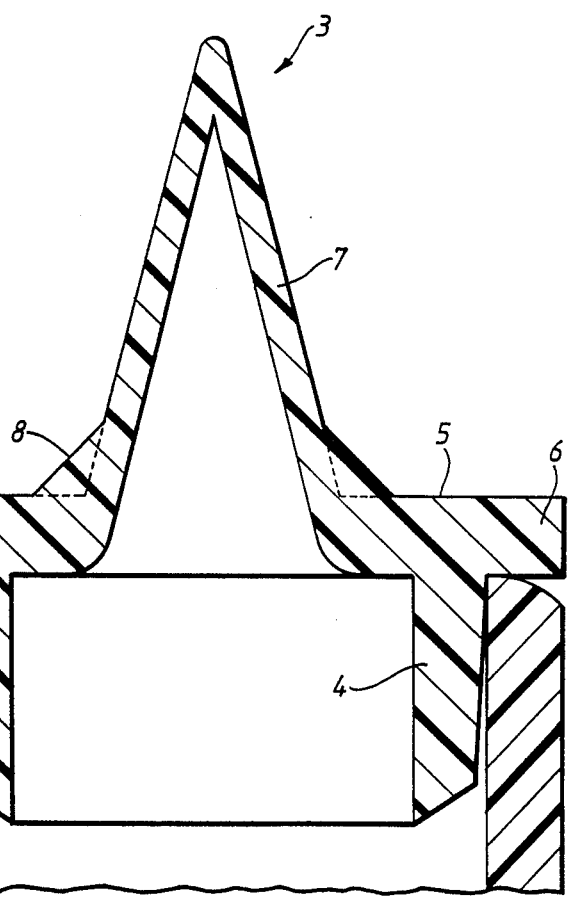
FIG. 2 shows a sectional view through an end component fitted into the cut end of a tube.
Figure 3:
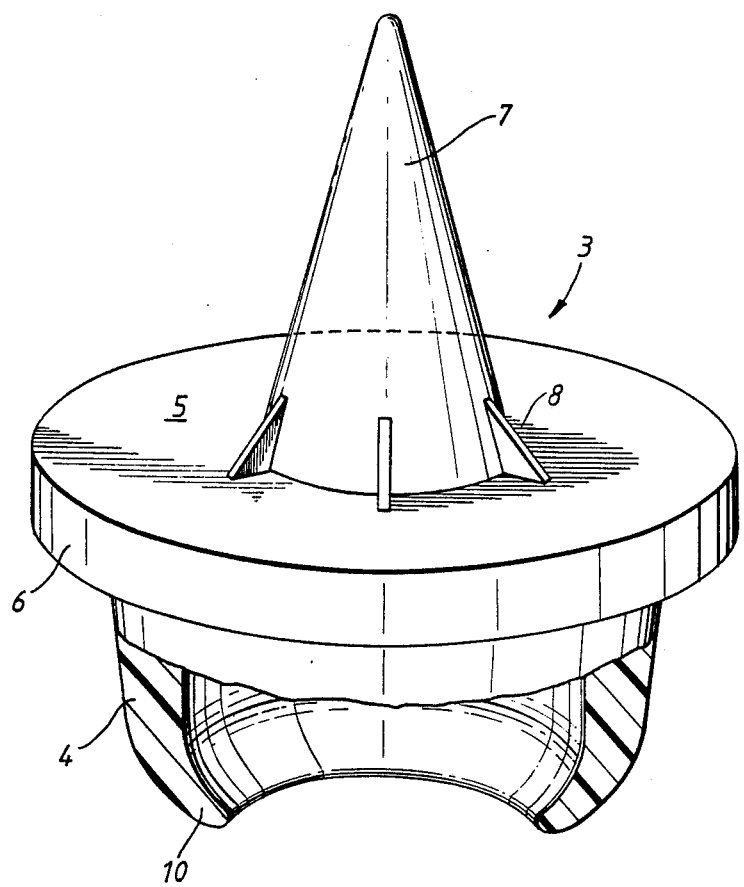
FIG. 3 shows a part sectional view of an alternative form of end component.

FIG. 2 shows a high-density polyethylene moulded end component 3 fitted into the open end 2 of the tube 1. It can be seen in FIG. 2 that the cut end of the tube has a chamfered profile which occurs naturally as a result of the stressed tube being cut from the outside by means of a rotary knife cutter. The end component comprises a substantially cylindrical range 4 which provides a welding skirt extending into the open end of the tube 1 and a transverse end wall 5. The wall 5 provides an annular flange 6 which extends radially outwardly from the outer end of the flange 4 and which overlies the chamfered open end of the tube 1. In the centre of the end component, the wall 5 is provided with a conical nozzle 7 and spaced around the base of the nozzle 7 are six webs 8 which are to be engaged for spinning the end component as will be described below. As can be seen in FIG. 2, the welding skirt is provided with a slight inwardly inclined taper in its outer surface. The taper angle is preferably in the range of 1°–3° and is ideally about 2°. The end of the welding skirt which first extends into the tube during assembly is provided with a lead-in surface 9 chamfered at about 45° to assist in assembly. FIG. 3 shows an alternative construction of the end component in which the lead-in surface is provided by a radial inturn 10 at the free end of the welding skirt 4.

FIG. 4 shows a drive chuck 11 which, during the welding operation, engages with the webs 8 on the end component by means of dogs 12. The chuck comprises an inner cylindrical sleeve 13 and an outer cylindrical sleeve 14. The outer sleeve is mounted via a range 15 to the end of a drive shaft 16 and the inner sleeve is axially displaceable within the outer sleeve against the action of a spring 17. Rotary drive is transmitted to the inner sleeve by pins 18 formed on the sleeve 14 and which engage in blind bores 19 formed in the sleeve 13.

Figure 5A:
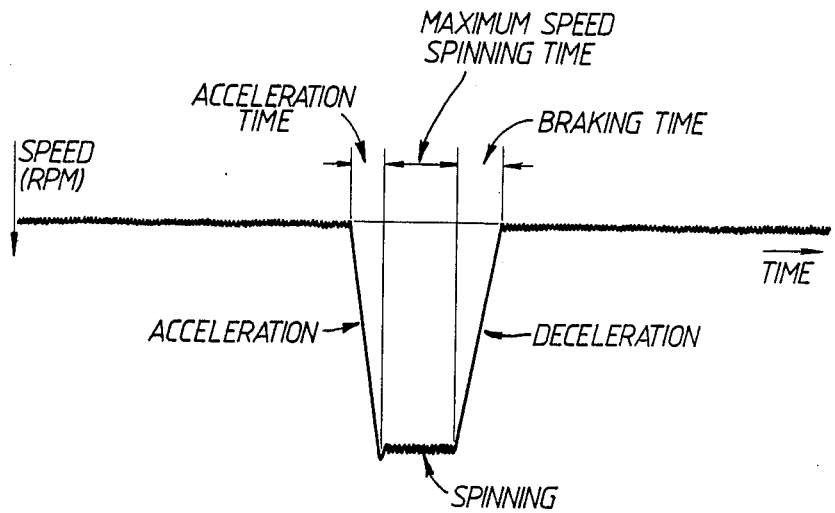
FIGS. 5a and 5b are redrawn oscilloscope traces of motor speed and torque during welding.
Figure 5B:
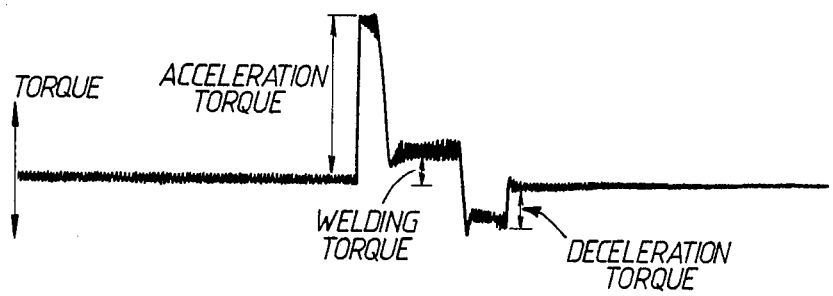

Rotary drive of the chuck 11 is provided via drive shaft 16 which is connected directly or indirectly to an appropriately sized programmable servo-motor (not shown). During the welding process the servo-motor rapidly accelerates the end component, whilst the tube is clamped, to a high peripheral speed of between 8 and 13 m/s. and maintains this speed for a length of time necessary only to form sufficient melt between the tube and the end component to form a fully integral weld. The servo-motor is then employed to brake all relative motion rapidly and the weld is allowed to solidify. A typical total acceleration, spin and brake time for a 50 mm diameter mastic tube and end component both made of high density polythene is about 0.22 s using a weld speed of about 10.8 m/s (4000 rpm), wherein the acceleration up to weld speed takes about 0.05 s and the corresponding deceleration takes about 0.08 s. A redrawn oscilloscope trace showing the spinning speed of the end component during a typical welding cycle is shown in FIG. 5a. FIG. 5b is a redrawn oscilloscope trace showing the torque applied by the servo motor during the welding operation.

The necessary radial contact pressure "PC" required to ensure welding between the tube and the welding skirt is provided primarily by the hoop stresses in the cut end of the tube. In FIG. 2, the maximum outside diameter of the welding skirt 6 is shown to be equal to the inside bore diameter of the tube 1. The contact pressure may be increased, however, by dimensioning the end component such that the maximum external diameter of the welding skirt 4 is greater than the internal diameter of the tube by up to about 0.375 mm. Any greater diametral interference can cause undesirable radial deflection of the tube walls. The use of a programmable servo-motor enables the energy input during welding to be precisely controlled and it is thus possible to substantially restrict the heat which is rapidly generated to the localised interface between the tube and the welding skirt, thus minimising any loss of hoop stress in the tube. This accurate control of the frictional heat energy between the contacting surfaces is made possible by the use of a powerful high speed programmable servo-motor and its associated drive and control electronics. One consequence of the very rapid localised generation of heat at the contacting surfaces is the formation of a very fluid molten polymer which has a tendency, unless prevented, to flow upwards and outwards between the end of the tube and the overlying flange 6 of the end component 3, thereby giving rise to unsightly and aesthetically unattractive flash. Any loss of material in this way also detracts significantly from the integral nature of the cylindrical weld formed between the tube 1 and the end component 3 such that leaks may result. In accordance with the present method, suitable preventative action consists of the application during the welding cycle of an axial pressure "PT" between the open end of the tube 1 and the overlying range 6 of the end component of a magnitude sufficient to effectively dam the upward and outward flow of melt from the main weld area, but not so high as to cause a separate source of melt generated by contact between the end of the tube and the flange 6. For 50 mm diameter polyethylene tubes as described it has been found that a minimum axial load, "PT", between the tube and the end component of about 0.22 N/mm$^2$ is required to dam the melt flow. Experiments have shown that an ideal axial load is about 0.4 N/mm$^2$. In practice, the required axial loading is provided by means of the spring loading of the inner sleeve 13 of the chuck 11. This loading can be adjusted as required by means of the screw 20.

With the controlled application of "PT" no hard, knobbly flash is produced which would require cutters to remove, but as a consequence of the finite contact pressure between the end of the tube and the flange 6 of the end component, some fine particulate debris may be produced when using high density polyethylene although this is so friable in nature that it has been found possible to remove it using only a light brushing action at a machine station immediately after the spin-welding station.

The characteristics of melt damming provided by the contact between the end of the tube 1 and the end component 3 have been found to be improved by the chamfered profile of the end of the tube which arises from the cutting of the tube as described above and which, in practice, limits the contact between the end of the tube and the overlying flange 6. The angle of the chamfer may be increased by cutting the tube at an inclination to its axis. Welds have been satisfactorily produced using tubes having their ends chamfered at an angle of between 50° and 70° to the axis of the tube. Chamfering of the end of the tube leads to the maximum axial pressure between the tube and the end component being located in the corner between the annular flange 6 and the cylindrical range 4 of the end component. This in turn leads to very efficient damming of the melt formed at the weld surfaces.

A further embodiment of an end component for use in the method of the present invention is shown in FIGS. 6 and 7, in which a small annular projection 25 is provided on the underside of the range 6. Such a projection will engage the end of the tube during welding and will provide effective damming of the melt from the weld when the appropriate axial loading "PT" is applied. The annular projection may be provided as an alternative to chamfering the end of the tube 1 or may be provided in combination therewith.

In a preferred method the materials selected for the tube and the end component have different characteristics. All high density polyethylenes have a similar melting point of about 130° C. but their latent heat of fusion dHm (the amount of heat energy necessary to melt one gram of material at the melting point temperature) varies according to their crystalline content. In general, the more crystalline the polymer, the greater the latent heat of fusion dHm. By selecting the materials used for making the tube and the end component, one or other can be made to melt preferentially at the weld area. Such a selection of materials is particularly advantageous in respect of the end component shown in FIG. 6 and in an example the end component was made of high density polyethylene having a dHm of 176 J/gm whereas the tube was made of a high density polyethylene having a dHm of 148 J/gm. During spin-welding, the tube melts more readily than the end component and thus the annular projection 25 is able to survive the welding operation and provide effective damming of the flow of melt from the weld area.

Through the due recognition and use of hoop stresses formed in extruded plastic tube, through the design of the end component to enable easy assembly, through the application of axial pressure during welding and through the controlled generation of frictional heat with respect to rate and magnitude using a high speed programmable servo motor, a substantially flash-free and unmarked container can be produced by spin-welding a plug fit end component into the open end of an extruded plastics tube.

Although the method described in relation to the drawings relates to the formation of a container having an end component which provides a nozzle for the dispensing of material from the container, it will be understood that the end component may be of a different construction and may provide, for example a substantially flat end wall for a cylindrical tube or a ring component adapted to receive a plug or lid.

We claim:

1. A method of spin-welding a moulded plastics end component into an open end of an extruded plastics cylindrical tube wherein the end component comprises a substantially cylindrical flange dimensioned to fit within the open end of the cylindrical tube and an annular flange extending from the outer end of the cylindrical flange and overlying the end face of the cylindrical tube when the end component and cylindrical tube are assembled, the method comprising the steps of
    (a) extruding the cylindrical tube from a die head and shock cooling the external surface of the cylindrical tube immediately after its emergence from the die head;
    (b) cutting the cylindrical tube to provide the open end such that hoop stresses generated in step (a) cause the open end of the cylindrical tube to contract radially;
    (c) inserting the end component into the contracted open end of the cylindrical tube such that an interference fit is provided between an inner surface of the contacted open end of the cylindrical tube and an outer surface of the substantially cylindrical flange of the end component and such that opposing cylindrical surfaces of the tube and the end component provide an area to be welded; and
    (d) spin-welding the end component to the cylindrical tube; wherein during step (d), an axial pressure is applied to the assembly sufficient to substantially prevent the escape of flash from the weld area but no radial pressure is applied to the assembly in the region of the weld area other than that provided by the interference fit between the end component and the tube and by the hoop stresses generated in the tube.

2. A method as claimed in claim 1 in which the end component is spun during welding by means of a programmable servo-motor.

3. A method as claimed in claim 1 or claim 2 in which the cut end of the tube has a chamfered profile.

4. A method as claimed in claim 1 or claim 2 in which the outer surface of the cylindrical flange of the end component has an inwardly inclined conical taper angle of about 2°.

5. A method as claimed in claim 1 or claim 2 in which the annular flange of the end component is provided in its surface facing the tube with an annular projection which engages the end of the tube during welding.

6. A method as claimed in claim 1 or claim 2 in which the tube and the end component are made from high density polyethylene.

7. A method as claimed in claim 6 in which the latent heat of fusion of the material of the end component is greater than the latent heat of fusion of the material of the tube.

8. A method as claimed in claim 1 in which the end component and the cylindrical tube are spin-welded together to form a container.

* * * * *